(No Model.)

W. WATSON.
STOPPERING WINE BOTTLES.

No. 507,862. Patented Oct. 31, 1893.

Witnesses.
G. H. Rea.
J. A. Saul.

Inventor,
William Watson,
By James L. Norris
Atty.

UNITED STATES PATENT OFFICE.

WILLIAM WATSON, OF NORWICH, ENGLAND, ASSIGNOR OF ONE-HALF TO HENRY JAMES HARDING, OF SAME PLACE.

STOPPERING WINE-BOTTLES.

SPECIFICATION forming part of Letters Patent No. 507,862, dated October 31, 1893.

Application filed May 11, 1893. Serial No. 473,789. (No model.)

*To all whom it may concern:*

Be it known that I, WILLIAM WATSON, a subject of the Queen of Great Britain, and a resident of Norwich, England, have invented an Improvement Relating to the Stoppering of Wine-Bottles, of which the following is a specification, reference being had to the accompanying drawings.

This invention relates to the stoppering of wine bottles and particularly champagne bottles.

It is well known that champagne and other bottled wines are frequently spoiled and rendered undrinkable by contact with a bad cork. The present invention is intended to obviate this loss and the annoyance caused thereby by protecting or covering the corks so that they cannot communicate any detrimental flavor to the bottled wine.

In carrying this invention into effect, the corks are preferably compressed to make them more firm and compact and they are then covered at the inner or smaller end with a layer or two or more layers of suitably cleaned skin or other impervious covering such as standard silver which will resist the action of the wine. The said covering is secured on the cork in any suitable manner. According to a modification of the invention an india rubber or like ring is employed to retain the skin or other protecting covering in place and especially to protect said skin or other covering while passing through the corking machine. The bottle neck is formed with a part of larger diameter to receive said ring.

Figure 1:
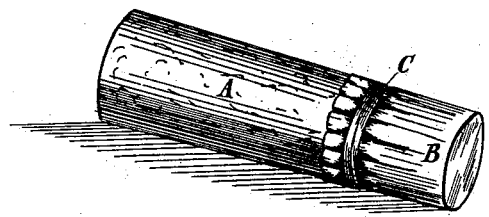
Figure 2:
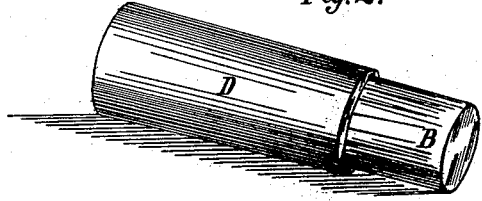
Figure 3:
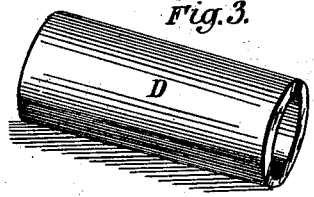
Figure 4:
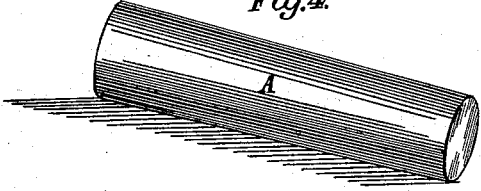

Figures 1 and 2 of the accompanying views illustrate two corks protected by an impervious covering at the end and constructed according to the present invention. Fig. 3 shows the rubber ring of Fig. 2 detached; and Fig. 4 shows the inner compressed cork.

A is the cork; B is the covering therefor which is made of standard silver or sheep skin or skin made from pig's bladder, or film from bullock's heart. The said covering may be molded in a suitable mold under the effects of heat or moisture or otherwise so as to assume the shape of a thimble adapted to fit the cork, or it may be cut from a piece of skin and folded over the cork. It is then secured to the cork in any suitable manner, as for example by an elastic or other band C Fig. 1, which is passed around the covering and nips the same in an annular recess formed around the cork. The said recess is made sufficiently deep to entirely receive the band so that the latter does not interfere with the insertion of the cork in the bottle neck. The covering may extend any desired or suitable distance along the cork from the point thereof toward the large end. For such a cork as that shown in Fig. 1 the bottle neck may either be cylindrical or have a slight uniform taper from the outer to the inner end. The covering B of the cork shown in Fig. 2 is held in place by a tightly fitting rubber or other ring D which extends from the head or top of the cork and is passed over the upper edge of the covering B so as to firmly secure the same. The ring D may be cemented or otherwise secured to the cork to prevent displacement thereof. The covering B may also be secured by cement or by a band C as in Fig. 1 in lieu of or in addition to its being held by the ring D. The bottle neck is made wider at the part which receives the ring D. In this modification the cork A is preferably made cylindrical throughout its length.

What I claim is—

A wine bottle cork comprising in combination with each other a cork A, a covering B arranged at the inner or smaller end thereof, extending along the side and made of material which is impervious to and is not attacked by wine, and a tightly fitting ring D which extends from the head or top of the cork and incloses and retains the upper edge of the said covering, substantially as and for the purpose described.

In witness whereof I have hereunto set my hand this 27th day of April, 1893.

WILLIAM WATSON.

Witnesses:
 E. E. BLYER,
*Solicitor, Norwich.*
 JAMES G. ROGERS,
*47 Park Lane, Norwich, Solicitor's Clerk.*